UNITED STATES PATENT OFFICE.

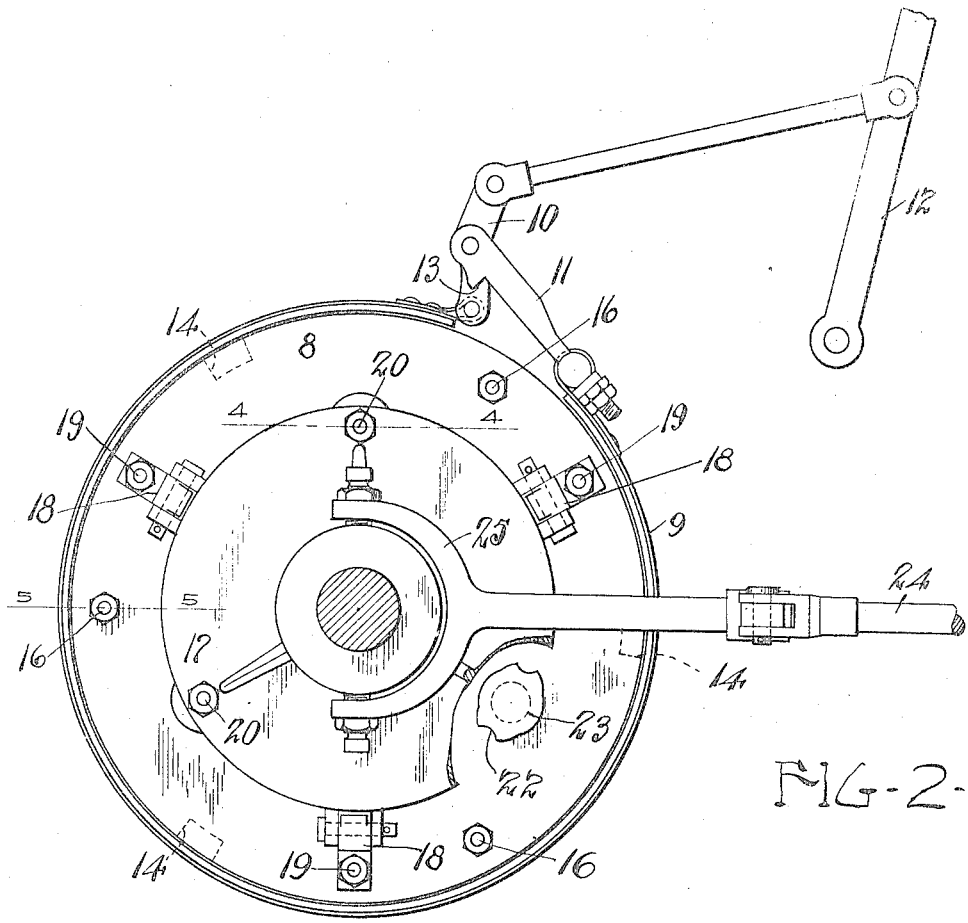
FIG-2-
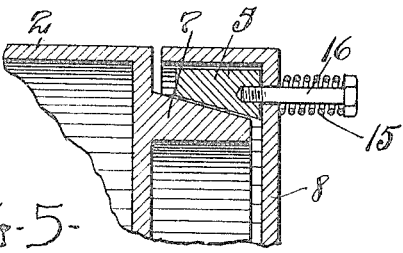
FIG-5-
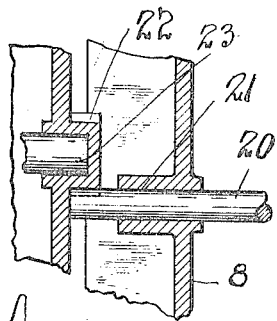
FIG-4-

GEORGE A. KENNEDY, OF MASSILLON, OHIO; MARIE KENNEDY, ADMINISTRATRIX OF SAID GEORGE A. KENNEDY, DECEASED, ASSIGNOR TO JACOB J. DAUCH, OF SANDUSKY, OHIO.

CLUTCH MECHANISM.

1,207,767.	Specification of Letters Patent.	Patented Dec. 12, 1916.

Application filed August 4, 1911.  Serial No. 642,374.

*To all whom it may concern:*

Be it known that I, GEORGE A. KENNEDY, a citizen of the United States, and a resident of Massillon, county of Stark, and State of Ohio, have invented a new and useful Improvement in Clutch Mechanism, of which the following is a specification, the principle of the invention being herein explained and the best mode in which I have contemplated applying that principle, so as to distinguish it from other inventions.

The present improved transmission mechanism, or gear, is designed more especially for use on self-propelled vehicles, and particularly gas tractors which are being employed more and more both for hauling purposes and for various agricultural operations. While certain of the features of such mechanism are thus designed to meet the peculiar requirements of this service, it is not meant to imply by the foregoing that the mechanism may not be used in other connections, where a variable speed transmission is desired.

Said invention, then, consists of the means hereinafter fully described, and particularly pointed out in the claim.

The annexed drawings and the following description set forth in detail certain mechanism embodying the invention, such disclosed means constituting, however, but one of various mechanical forms in which the principle of the invention may be used.

Figure 1:
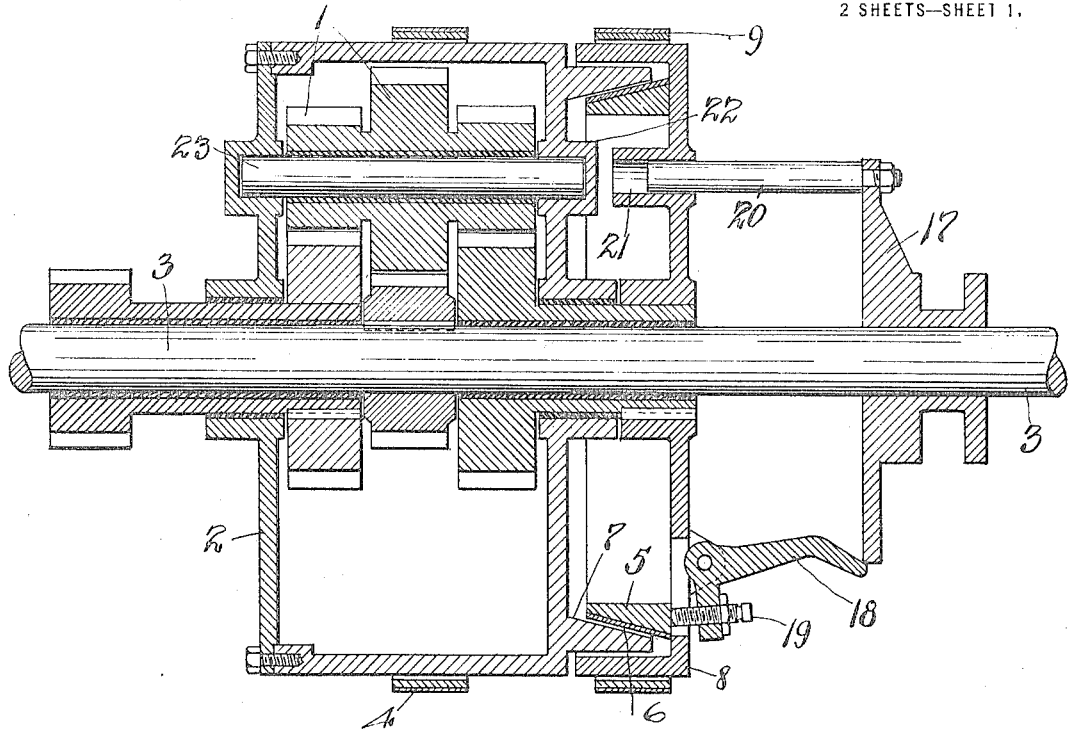
Figure 3:
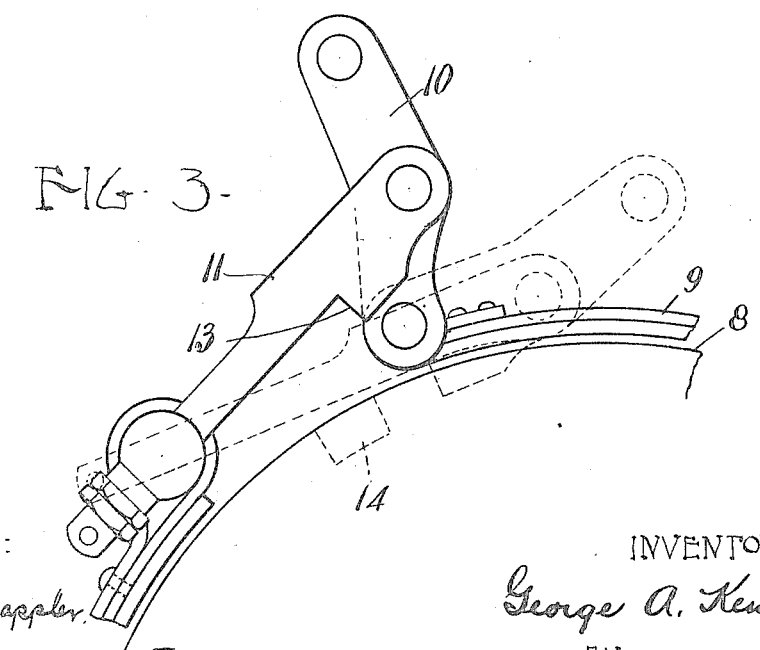

In said annexed drawings:—Figure 1 is a longitudinal central section of a transmission gear embodying my present improvements; Fig. 2 is an end elevational view thereof; Fig. 3 is an enlarged view of a detail of the mechanism; Fig. 4 is a section on the line 4—4, Fig. 2; while Fig. 5 is a section on the line 5—5 of the same Fig. 2.

As is well known, some form of frictional clutch has been found essential to any transmission gear interposed between a gas or other explosive engine and the mechanism to be driven thereby, for the reason that the engine must be allowed to run at a considerable speed in starting before it can be geared to its load. Where, however, the load is apt to be irregular and at times very heavy, as in the case of a tractor, it has been found that satisfactory reliance cannot be placed on any known type of frictional driving connection, in other words, even the best types of cone and multiple disk clutches, which are so generally used in automobiles, will fail to hold under the strain imposed in these new and more trying surroundings. Under such circumstances, in fact, it becomes necessary to directly couple the engine to the drive-shaft if the power of the former is to be rendered available. The present improved transmission, accordingly, provides for an initial frictional connection, replacing the same by a direct, or positive, connection should such frictional connection give way, or, in other words, slip.

The general type of transmission gear in connection with which the present improvements are illustrated in the several figures of the drawings, is the so-called planetary type, and the frictional clutch associated therewith is a cone-clutch; but it will be understood that the aforesaid improvements may be applied with equally beneficial results to other types of transmission, and in combination with other types of frictional connection than these specifically illustrated. It is not deemed necessary to describe in detail the planetary transmission gear proper (such gear being of well known construction) other than to note that said gear 1 is housed within a cylindrical casing 2, normally rotatable upon or with the shaft 3, but adapted to be held against such rotation by a friction band 4. The shaft 3 which is here the driver, is adapted to be connected with said casing 2 by means of a cone clutch member 5, the convex face of which is covered with leather 6, or other equivalent material, and is disposed adjacent to the concave face of the complementary clutch member 7 that is formed integrally with one end wall of the casing. Such convex clutch member 5 is carried within a drum-like housing 8, to which it is non-rotatably secured although capable of movement longitudinally of the axis of the driving shaft. Such drum is adapted to be held against rotation, when desired, by a frictional band 9 similar to the one that coöperates with the gear casing 2. Various driving effects, both forward and reverse, are secured by applying one or the other of the brake bands, or by throwing the convex clutch member into engagement with the concave member borne by the gear casing. Certain details in the construction of such frictional bands or rather in the mechanism for tightening the same upon their respective drums will first be noted, then the mechanism for throwing in such cone clutch member.

As shown in Figs. 2 and 3 in connection with band 9, the opposite ends of each friction band are joined together by two pivotally connected members 10 and 11, the former of which acts as a lever, being connected with suitable operating means, such as a hand or foot lever 12, by proper movement of which the ends of the bands may be drawn together. The other 11, of the two members connecting such ends, is provided on its under side with a lug 13 that is adapted when said member is thrown flat against the drum, as in the extreme tightening position, to engage with a lug or recess on such drum, (a lug 14 being shown). The result of this is to positively lock the drum against rotation after the full effect of the friction band has been exerted. Preferably several such lugs 14 are disposed equidistantly about the drum's periphery so that the amount of slip which can occur will be relatively slight.

The cone clutch member 5 is normally retained out of contact with the complementary member by means of springs 15 disposed as illustrated in Fig. 5 between the end face of the inclosing drum 8 and the heads of bolts 16, the inner ends of which are attached to said member. A slidable collar 17 on the shaft 3, however, is adapted to force said clutch member inwardly into engagement with the complementary member through the medium of bell-crank levers 18, with the outer ends of which said collar engages, while their inner ends are provided with adjustable set-screws 19 bearing against the outer edge of the clutch member. Said collar also carries a plurality (three as shown) of rods 20 which pass through suitably disposed apertures 21 in the end wall of the drum and are adapted, as said collar is forced inwardly, to approach the end wall of the gear casing 2, although they do not contact therewith. In the limiting position of the collar, however, in which the utmost pressure through the bell-cranks is expended, these rods do extend almost in contact with said wall, in which position they lie at the same radial distance from the center as do projecting lugs 22, which in the present construction serve the further function of providing end bearings for the shafts, or spindles 23, that carry the planetary gears 1. Accordingly, if any slippage occurs between the cone clutch members, these rods will engage with such lugs, which are properly formed so as to lock therewith (see Figs. 2 and 4), thus providing a positive driving connection between the two shafts. Operation of the collar is secured through a lever 24 having a yoke 25 at its inner end, as illustrated in Fig. 2.

The foregoing mechanism illustrates one form of the present device as attached to a cone clutch. In this device it will be seen that the positive connection between the two clutch members, is made only after the frictional engagement is complete and the two members are revolving at approximately the same speed. This allows the positive connection to be made without subjecting the parts to any sudden shock or jar which would take place if the speeds of the two members varied greatly at the time of making the positive connection.

Other modes of applying the principle of my invention may be employed instead of the one explained, change being made as regards the mechanism herein disclosed, provided the means stated by the claim or the equivalent of such stated means be employed.

I therefore particularly point out and distinctly claim as my invention:—

In mechanism of the class described, the combination of a clutch member having lugs thereon; a second longitudinally movable coöperative clutch member provided with apertures; a slidably mounted collar having locking pins adapted to be received in such apertures in said movable clutch member and adapted to engage with such lugs upon the first clutch member in one position of said collar to positively lock said clutch members together; bell crank levers pivotally mounted on said movable member and having bent arms adapted to be engaged by said collar; adjusting screws mounted in the other arms of said bell-crank levers and contacting said clutch member, movement of said collar being adapted to first move said longitudinal movable clutch member into engagement with said relatively stationary clutch member, further movement being adapted to bring said locking pins into engagement to give a positive drive, the relative point at which the positive lock takes place being dependent upon the adjustment of said screws.

Signed by me this 24 day of July 1911.

GEORGE A. KENNEDY.

Attested by—
 A. DAUPHISON,
 RUTH WEIKERT.